US012684089B1

(12) United States Patent
Nguyen

(10) Patent No.: US 12,684,089 B1
(45) Date of Patent: Jul. 14, 2026

(54) DEVICE LOCATION OPTIMIZATION FOR VIDEO CONFERENCING

(71) Applicant: Zoom Communications, Inc., San Jose, CA (US)

(72) Inventor: Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 171 days.

(21) Appl. No.: 18/475,967

(22) Filed: Sep. 27, 2023

(51) Int. Cl.
| | |
|---|---|
| *H04N 7/10* | (2006.01) |
| *G06T 19/00* | (2011.01) |
| *G06V 10/60* | (2022.01) |
| *H04N 7/15* | (2006.01) |

(52) U.S. Cl.
CPC ........... *H04N 7/152* (2013.01); *G06T 19/006* (2013.01); *G06V 10/60* (2022.01); *G06V 2201/07* (2022.01)

(58) Field of Classification Search
CPC .... H04N 7/152; G06V 10/60; G06V 2201/07; G06T 19/006
USPC ...................................................... 348/14.09
See application file for complete search history.

(56) References Cited

U.S. PATENT DOCUMENTS

| | | | | |
|---|---|---|---|---|
| 10,893,381 | B2 * | 1/2021 | Kazemi ................... | G01S 19/39 |
| 11,082,465 | B1 | 8/2021 | Chavez et al. | |
| 11,122,160 | B1 | 9/2021 | Fardig et al. | |

| | | | | |
|---|---|---|---|---|
| 2011/0128452 | A1 * | 6/2011 | Kim ................. | H04N 21/43615 |
| | | | | 348/E5.125 |
| 2012/0077522 | A1 * | 3/2012 | Mate ...................... | H04N 5/268 |
| | | | | 455/456.3 |
| 2012/0155680 | A1 | 6/2012 | Chen et al. | |
| 2020/0202626 | A1 | 6/2020 | Moody et al. | |
| 2020/0351112 | A1 | 11/2020 | Brooks et al. | |
| 2021/0044645 | A1 * | 2/2021 | Jayaweera ......... | H04L 12/1822 |
| 2022/0230396 | A1 * | 7/2022 | Croxford ........... | G02B 27/0103 |
| 2023/0196537 | A1 * | 6/2023 | Gupta ................... | G06V 10/60 |
| | | | | 382/275 |
| 2023/0229372 | A1 * | 7/2023 | Suwa ........................ | G06F 3/14 |
| | | | | 345/8 |
| 2023/0284178 | A1 * | 9/2023 | Parker ...................... | G01S 5/01 |
| | | | | 455/456.1 |
| 2023/0396487 | A1 * | 12/2023 | Shetty ................. | H04L 41/5067 |
| 2024/0422396 | A1 * | 12/2024 | Loughman ........... | G06V 40/174 |

OTHER PUBLICATIONS

NY Times, Wirecutter, How Automatic Room Correction Can Help (and Hurt) Your Sound System, https://www.nytimes.com/wirecutter/blog/automatic-room-correction/, Brent Butterworth, May 7, 2020, 9 pages.
Dirac, Dirac Live, https://www.dirac.com/live/, retrieved from internet Sep. 22, 2023, 15 pages.
Youtube, How to use Room EQ Wizard Pt. 2—Acoustic Measurement Analysis, https://www.youtube.com/watch?v=CuEwoeN7ZJk, Music City Acoustics, Apr. 30, 2022, 4 pages.

* cited by examiner

*Primary Examiner* — Binh Kien Tieu
(74) *Attorney, Agent, or Firm* — Young Basile Hanlon & MacFarlane, P.C.

(57) ABSTRACT

Sensor data that include ambient qualities of multiple locations within a physical environment is obtained by a device. A location within the physical environment at which to place a participant device to connect to a video conference is determined based on the sensor data. An indication of the location is output for display at the device.

20 Claims, 11 Drawing Sheets

900

902 — OBTAIN SENSOR DATA

904 — DETERMINE SCORES OF MULTIPLE LOCATIONS BASED ON THE SENSOR DATA

906 — OMIT LOCATION(S) THAT HAS NETWORK SIGNAL STRENGTH BELOW THRESHOLD

908 — GENERATE AR MAP THAT INDICATES AN OPTIMIZED LOCATION

910 — OUTPUT INDICATION OF THE OPTIMIZED LOCATION FOR DISPLAY

1000

1002

OBTAIN SENSOR DATA

1004

DETERMINE SCORES OF MULTIPLE LOCATIONS BASED ON THE
SENSOR DATA AND ROLE OF A MEETING PARTICIPANT

1006

GENERATE AR MAP THAT INDICATES AN OPTIMIZED LOCATION

1008

OUTPUT INDICATION OF THE OPTIMIZED LOCATION FOR DISPLAY

1100

1102 ──

PARTICIPANT DEVICE IS PLACED IN AN OPTIMIZED LOCATION

1104 ──

DETECT INTERNAL OR CONNECTED HARDWARE

1106 ──

CONFIGURE HARDWARE SETTINGS

DEVICE LOCATION OPTIMIZATION FOR VIDEO CONFERENCING

FIELD

This disclosure generally relates to video conferencing, and, more specifically, to determining an optimized device location for participating in a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
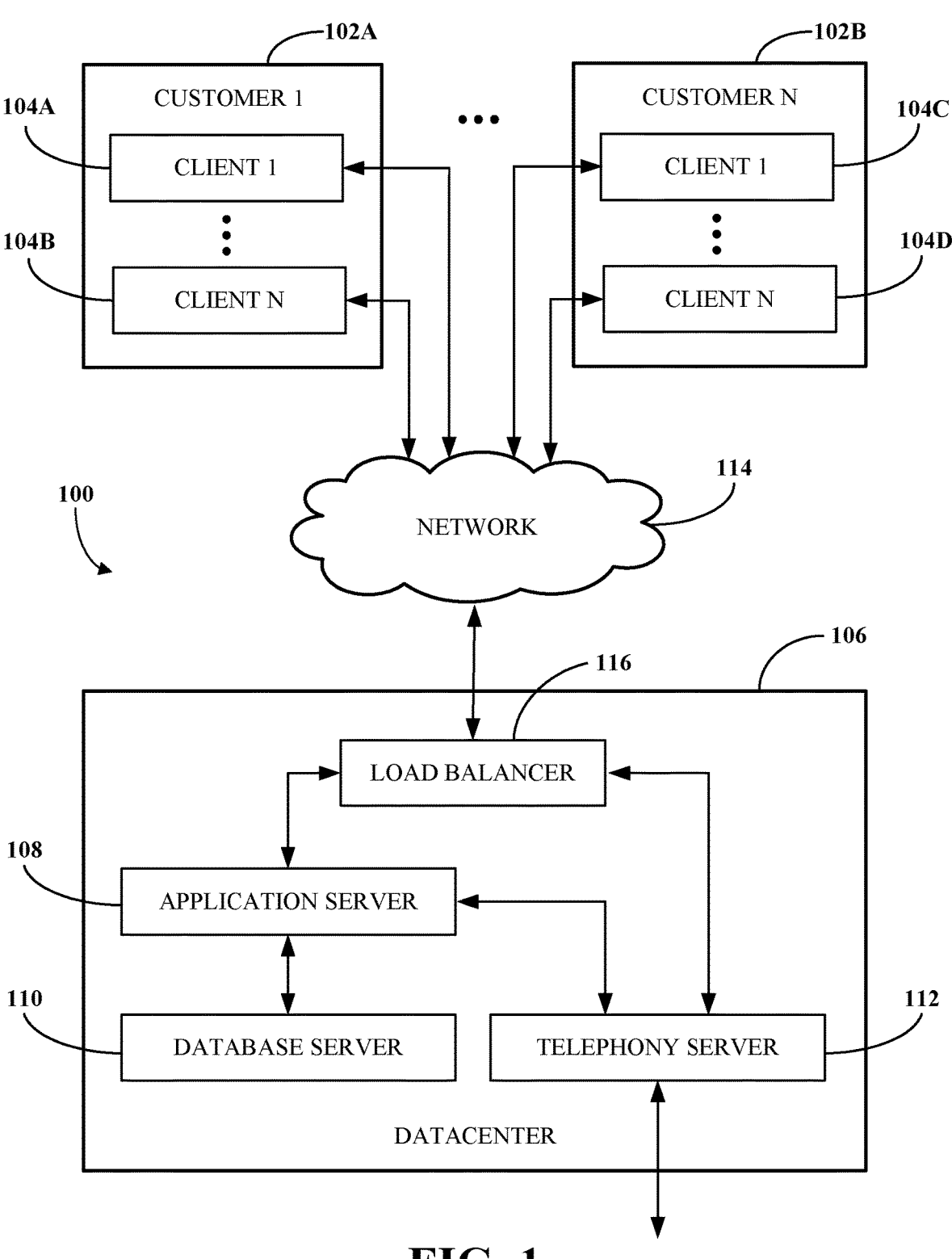
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, multiple conference participants may be physically located in and connect to the conferencing software from a conference room or similar physical environment (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conference participants, especially those connecting to a video conference using a participant device, often need to pick a specific location within their physical environment at which to place the participant device for use during the video conference. The location of the participant device plays a substantial role in determining the efficacy and/or quality of the participant's engagement with the meeting. In particular, there may be different locations (e.g., positions) within a physical environment (e.g., a room) where the participant device can be set-up for use during the video conference, and different lighting and/or noise aspects at those locations may result in different sound quality and lighting quality for the media captured at the participant device. For example, a participant's room may include something that produces ambient noise, which, when the participant's device is too close thereto, may cause the ambient noise to be captured within the participant's audio stream and thus may make it difficult for other participants in the video conference to understand what the participant is saying at a given time. In another example, since light intensity levels and directions of light (e.g., angular direction) may vary depending on different locations within the room, the participant's appearance within their video stream of the video conference may vary depending on where the participant device is relative to such light sources. That is, if the lighting is too dim, it may be hard for other participants to see the participant; however, if the lighting is too bright or coming from behind the participant, it can cause glare or shadows that obscure the participant's face. In yet another example, network connectivity (e.g., network signal strength, network quality) is important and may vary at different locations within the room. If the connection is unstable or slow, it can lead to audio and/or video quality issues that can, for example, disrupt the conference experience for some or all participants.

Implementations of this disclosure address problems such as these by determining an optimized location for the participant device to connect to the video conference, in which the optimized location reflects an optimum balance of sound quality, brightness level, and/or network connectivity for enhancing the quality of the participant's activity within the video conference. The optimized location can be determined by software running at a scanning device obtaining sensor data (e.g., video or image, light intensity, ambient sound, and/or network connectivity) from one or more sensors of that scanning device, assigning scores or ratings to multiple locations within the room, generating a map that includes the multiple locations and respective scores or ratings, and/or providing one or more device location recommendations to the participant. For example, a camera, a microphone, a speaker, and/or AR feature of a mobile phone or appropriate computing device may be used to record or capture environmental context of various locations within the room. The device may then determine scores for the various locations according to perceived media capture criteria, for example, based on lighting, ambient noises, and/or network signal strength at those locations. Moreover, the different standards for determining scores for the various locations may be applied depending on a role of the participant by assigning different weights to one or more of different criterion of the perceived media capture criteria, since different participant roles entail different priorities of ambient qualities (e.g., sound quality, brightness level, network connectivity, etc.). The device may then generate a recommendation indicating an optimized location for the participant device for the video conference. The participant using the participant device may thus move the participant device to that optimized location and then connect to the video conference.

To describe some implementations in greater detail, reference is first made to examples of hardware and software structures used to implement a location optimization system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
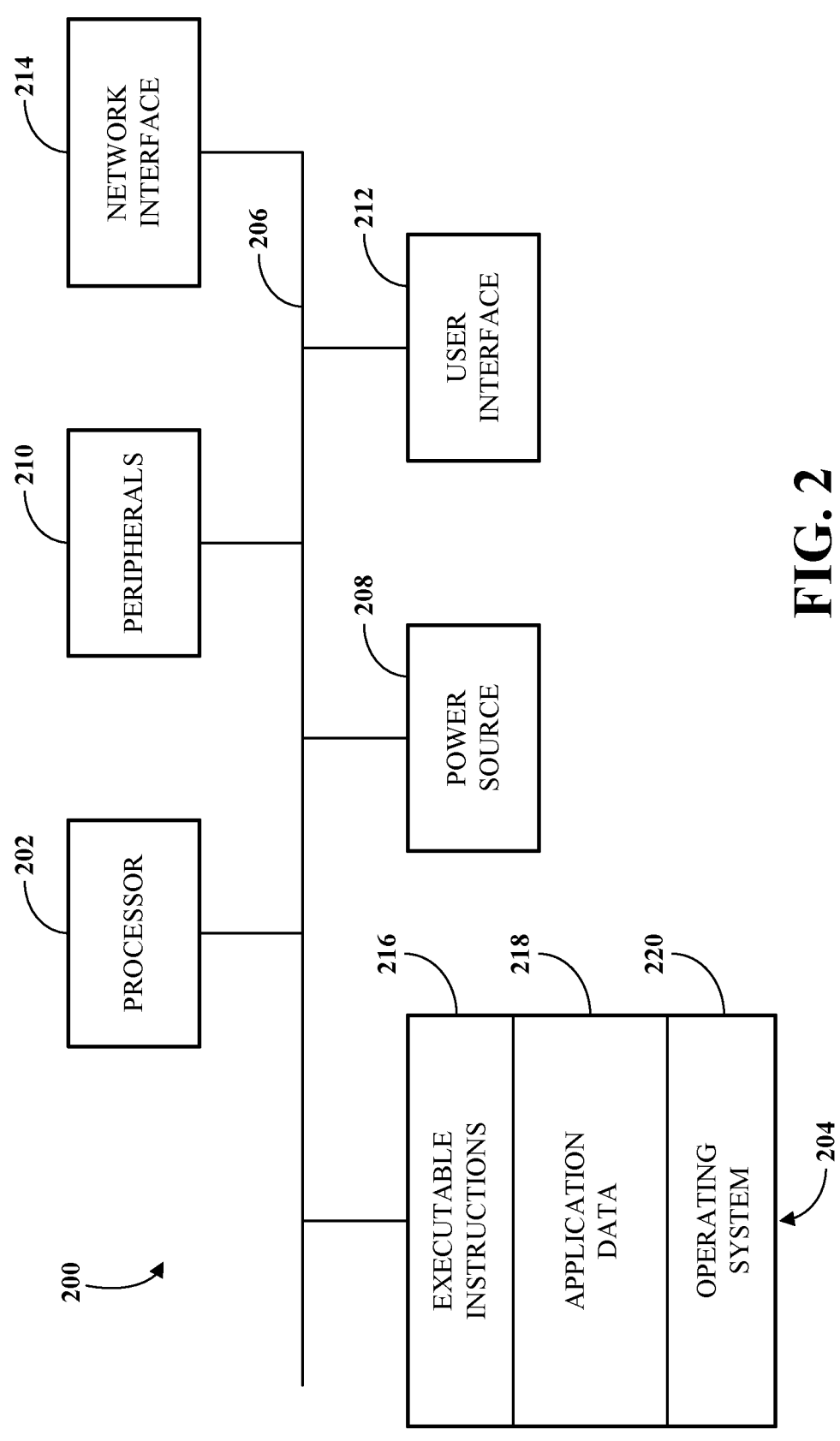
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 1002.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
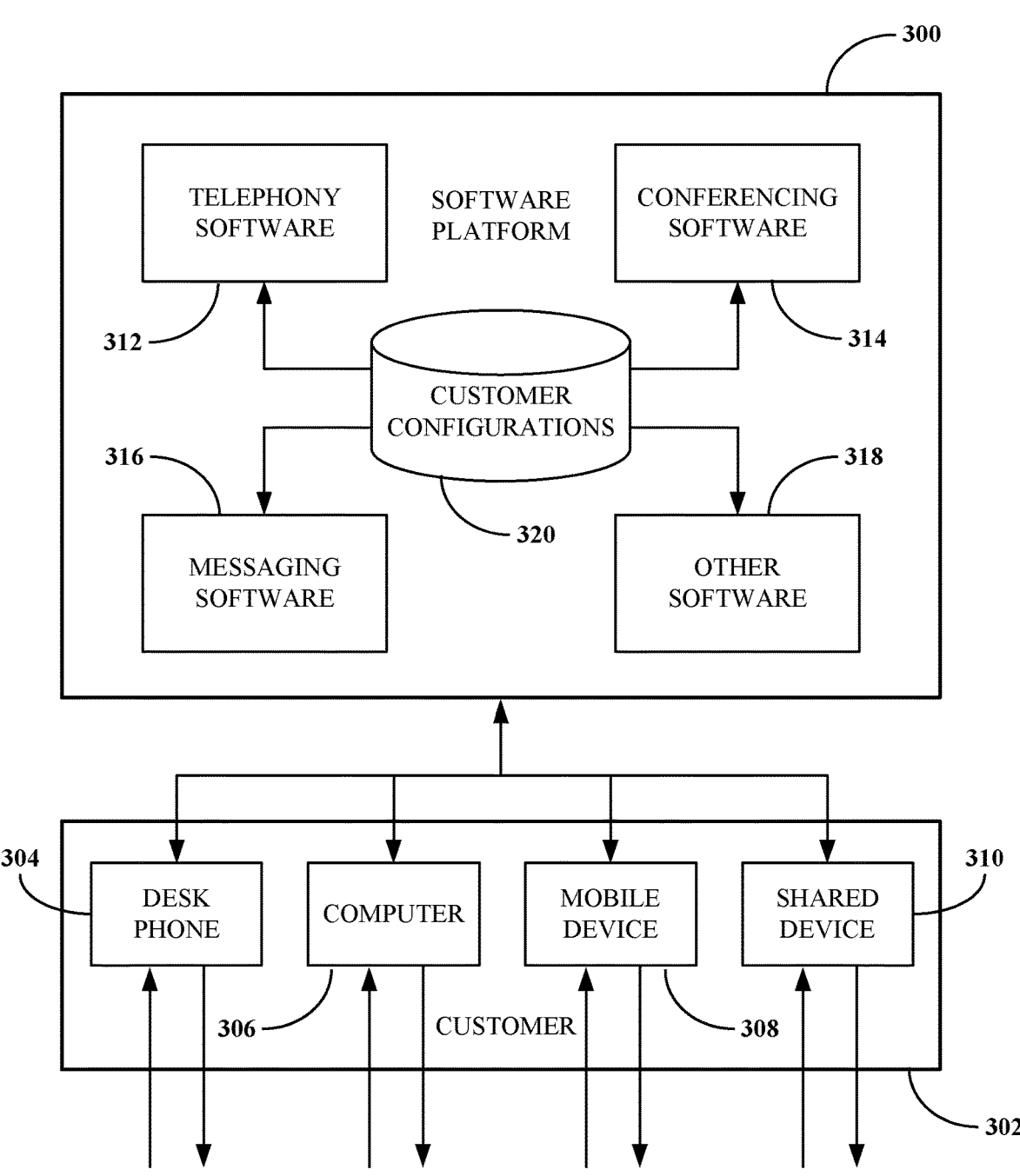
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through the shared device 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include location optimization software and/or hardware optimization software, as disclosed herein. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
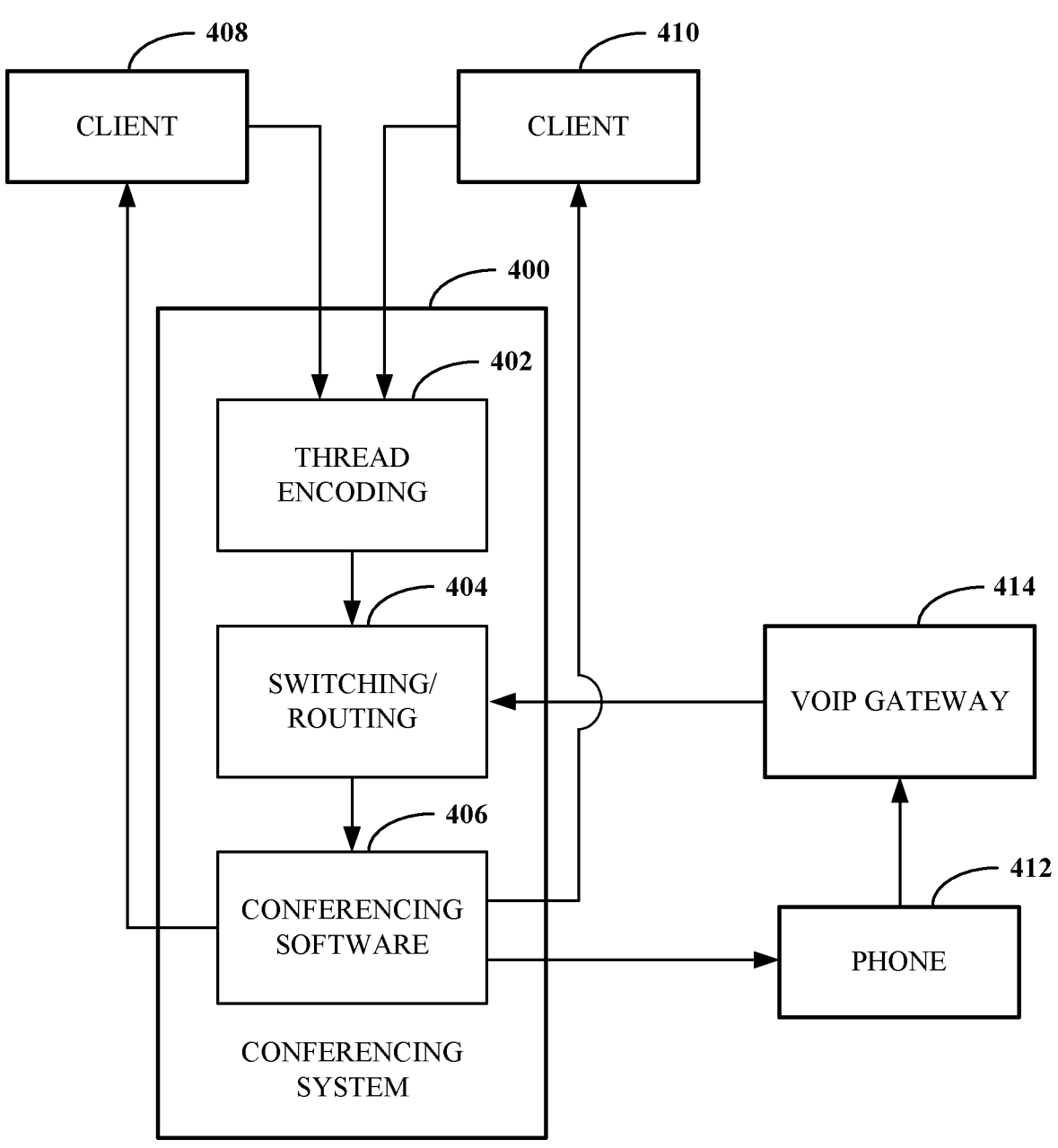
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
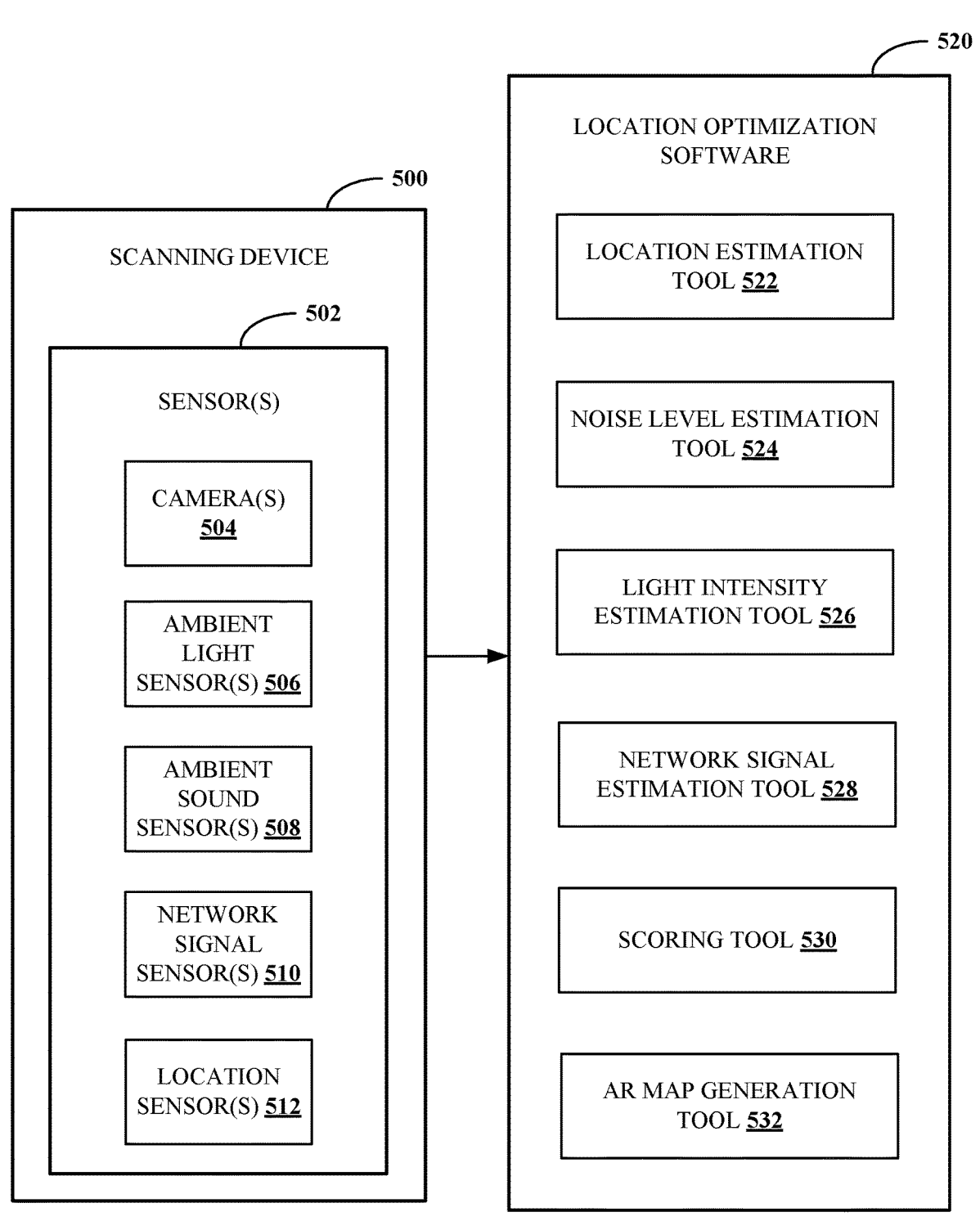
FIG. 5 is a block diagram of an example of a location optimization system for determining an optimized location of a device utilized for participation in a video conference.

FIG. 5 is a block diagram of an example of a location optimization system for determining an optimized location of a participant device utilized for participation in a video conference. The location optimization system includes or otherwise uses a scanning device 500 (e.g., a mobile device such as a smartphone, a tablet computer, or a laptop computer), sensor(s) 502 of the scanning device 500, and a location optimization software 520 used to process sensor data output by the sensor(s) 502 to determine the optimized location for the participant device to participate in a video conference. The scanning device 500, which may, for example, be the mobile device client 308 shown in FIG. 3 or another client (e.g., one of the clients 408 or 410 shown in FIG. 4), includes the sensor(s) 502, a memory configured to store instructions for executing the location optimization software 520, and a processor configured to execute those instructions. In at least some cases, the location optimization software 520 may represent functionality of, and thus be included within, a client application running at the scanning device 500.

The sensor(s) are configured to produce and output sensor data corresponding to ambient qualities of each of multiple locations (e.g., positions) within a physical environment (e.g., an interior or exterior room or space of a house, apartment, office, public facility, or the like). The sensor(s) 502 may include one or more of camera(s) 504, ambient light sensor(s) 506, ambient sound sensor(s) 508, network signal sensor(s) 510, or location sensor(s) 512. The ambient sound sensor(s) 508 may include one or more of microphone(s) and/or speaker(s). The network signal sensor(s) 510 may include one or more of modem(s), antenna(s), and/or Wi-Fi module(s). The location sensor(s) 512 may include one or more of global positioning system (GPS) sensor(s), motion sensor(s) (e.g., accelerometer, gyroscope), and magnetometer(s). Moreover, the sensor(s) 502 may further include one or more of depth sensor(s) (e.g., Light Detection and Ranging (LiDAR) sensor), ultrasonic sensor(s), and sonar sensor(s).

The sensor data obtained from the sensor(s) 502 that represent ambient qualities may include video data, light intensity data, ambient sound data, network signal data, and location data. The ambient qualities may include visual depiction of surroundings, brightness level and/or directions of light, noise level, echo level, network connectivity (which includes network signal strength and network quality of internet connection and/or intranet connection) at the multiple locations within the physical environment.

The visual depiction of surroundings may be represented by one or more images or a video of the video data obtained by the camera(s) 504. The brightness level and/or the direction of light at the multiple locations may be represented by the light intensity data obtained by the ambient light sensor(s) 506. In some implementations, the brightness level and/or the direction of light at the multiple locations may be based on, or derived by, evaluating the visual depiction of surroundings represented by the one or more images or the video of the video data obtained by the camera(s) 504. For example, pixels in the one or more images of the video data may be utilized to derive or determine the brightness level and/or the direction of light. For example, a lighting level for each pixel can be used to generate spatial distribution and determine brightness level and/or direction of light. For example, the spatial distribution can indicate pixels or regions which are bright in contrast to pixels or regions which are dark, which in turn can be used to indicate where light is coming from and in what direction. Such evaluation of the visual depiction of surroundings to derive the brightness level and/or the direction light at the multiple locations may be performed as part of processing the video data through the location optimization software 520.

The noise level and/or the echo level at the multiple locations may be based on, or derived from, the ambient sound data (e.g., audio data) obtained from the ambient sound sensor(s) 508, such as the microphone(s) and/or the speaker(s). The network signal strength at the multiple locations may be based on, or derived from, the network signal sensor(s) 510, such as the modem, the antenna, and/or the Wi-Fi module.

After the sensor data is collected from the sensor(s) 502, the location optimization software 520 processes the sensor data to determine an optimized location for the participant device for participating in the video conference based on processed sensor data. The participant device may a different device than the scanning device 500. The participant device may a mobile device (e.g., a smartphone, a tablet computer, or a laptop computer). For example, the participant device may be the mobile device client 308 or the computer client 306 shown in FIG. 3 or another client (e.g., one of the clients 408 or 410 shown in FIG. 4). For example, the scanning device 500 and the participant device may be two separate mobile devices. For example, while the scanning device 500 may be a smartphone, the participant device may be a laptop. In some implementations, the scanning device 500 may be a laptop or the computer client 306, when such laptop is equipped with sensors such as the sensor(s) 502 and can execute the location optimization software 520.

The location optimization software 520 may include tools, such as programs, subprograms, functions, routines, subroutines, operations, executable instructions, and/or the like for, inter alia and as further described below, determining the optimized location for the participant device utilized for participation in the video conference.

At least some of the location optimization software 520 can be implemented as respective software programs that may be executed by the scanning device 500. A software program can include machine-readable instructions that may be stored in a memory (such as the memory of the scanning device 500), and that, when executed by the processor, cause the scanning device 500 to perform the instructions of the software program. As shown, the location optimization software 520 may include a location estimation tool 522, a noise level estimation tool 524, a light intensity estimation tool 526, a network signal estimation tool 528, a scoring tool 530, and an AR map generation tool 532. In some implementations, the location optimization software 520 can include more or fewer tools. In some implementations, some of the tools may be combined, some of the tools may be split into more tools, or a combination thereof. In some implementations, the location optimization software 520 may run on the server, or both the scanning device 500 and the server.

The location estimation tool 522 may be used to detect and estimate the multiple locations within the physical environment. For example, the location estimation tool 522 may utilize the sensor data to identify feature points (e.g., high-contrast points) in the scene that can be tracked frame to frame from the camera(s) 504 or the video data. For example, simultaneous localization and mapping (SLAM) techniques may be used to map an environment while keeping track of location. For example, the video data or the camera(s) 504 of the scanning device 500 may be used to detect and track the visual features in the environment, such as corners, walls, blinds, textured regions, etc. For example, the SLAM technique can compare known motion of the scanning device 500 based on the motion sensor(s) with the visual motion observed from the camera(s) 504 or the video data, such that the map which includes the feature points and/or the multiple locations within the physical environment can be generated. Moreover, the SLAM technique may further utilize data obtained from depth sensor(s) (e.g., LiDAR sensor) that can obtain sensor data representing or including the distance to objects, the feature points, and/or the multiple locations within the physical environment to help create the map with accurate measurement of the distance to and between the objects, the feature points, and/or the multiple locations.

Moreover, the location estimation tool 522 may detect, identify, and/or determine specific items or factors (e.g., red flag items) that could compromise the video conference quality (e.g., video quality, audio quality, etc.) or pose health concerns to a meeting participant (e.g., video conference participant). These items may include microwave, air conditioning units, objects with sharp edges, devices or items that interfere with network signals and/or produce ambient noise among others.

The noise level estimation tool 524 may estimate noise level and/or echo level at the multiple locations within the physical environment. For example, the noise level estimation tool 524 may use the ambient sound data (obtained by the ambient sound sensor(s) 508) at the multiple locations to estimate the noise level and/or the echo level at respective locations. In some implementations, the ambient sound data may include data that was obtained by using the speaker(s) and the microphone(s) of the scanning device 500 to emit system-generated sound (e.g., inaudible sound, random sound) from the speaker(s) and then use the microphone to listen for its reflection, such that the noise level and/or the echo level at that respective location can be determined, and such ambient sound data may be obtained at the multiple locations. In some implementations, noise level estimation tool 524 may gain access to and/or use the speaker(s) and the microphone(s) of the scanning device 500 to emit system-generated sound and listen for its reflection.

The light intensity estimation tool 526 may estimate light characteristics (that are relevant to quality of the video conference), which may include brightness level, light direction, light color temperature, and other characteristics. For example, the video or the image(s) of the video data and/or the light intensity data may be processed to determine the light characteristics. For example, the light characteristics may be based on, or derived by, evaluating the visual depiction of surroundings represented by the one or more images or the video of the video data obtained by the camera(s) 504. For example, pixels in the image(s) of the video data may be utilized to derive or determine the light characteristics. For example, lighting level for each pixel can be used to generate spatial distribution and determine the brightness level, the direction of light, the light color temperature, and other characteristics. For example, the spatial distribution can indicate pixels or regions which are bright in contrast to pixels or regions which are dark, which in turn can be used to indicate where light is coming from and in what direction. For example, the light direction may be determined based on shadows casted by the light, orientations of the shadows, and/or specular reflections or highlights on objects. For example, the light color temperature may be determined by evaluating a white balance or detecting known objects and assessing color deviation from expected color. In some implementations, the light characteristics may be determined based on the light intensity data obtained by the ambient light sensor(s) 506.

The network signal estimation tool 528 may process the network signal data obtained by the network signal sensor(s) 510 to determine the network signal strength and/or the network quality. The network quality may be determined based on factors such as reference signal received quality (RSRQ), signal to noise ratio (SNR), channel quality indicator (CQI), etc.

The scoring tool 530 may determine scores for each of the multiple locations based on one or more of the noise level, echo level, light characteristics, network signal, network strength, or the specific items or factors (e.g., the red flag items) that could compromise the video conference quality or pose health concerns to the meeting participant. The score may correspond to a score or a priority level that represents an optimality (or degree of optimality) of each location to set up the participant device for participation in the video conference.

For example, the score or a final composite score of each individual location of the multiple locations may be based on one or more of noise level, echo level, light characteristics, network signal, network strength, or the red flag items. For example, respective score may be assigned to each criterion (e.g., noise level, echo level, light characteristics, network signal, and network strength) at respective location, each criterion may be assigned a weight based on its importance (e.g., pre-determined importance) to the video conference, and weighted sum of all criteria can be used to determine the final composite score of the respective location. Moreover, depending on the type of the red flag item present, weighted sum can be reduced to a certain pre-determined amount (e.g., minus 10 points in a 100 point scale when there is microwave oven nearby and depending on how far (e.g., 1.5 meters away) the microwave oven is located from that location more points can be deducted, minus 7 points when there is a sharp edge of furniture that is 1 meter away from that location, minus 10 points when the sharp edge of the furniture is 0.5 meter away from that location, etc.) in determining the final composite score of the respective location. In similar manner, the final composite score can be determined for multiple locations within the physical environment.

In some implementations, determining what criterion(s) is to be used to determine the final composite score of each individual location may include determining a role of the participant who uses the participant device to participate in the video conference. For example, depending on different types of roles of the participant, different criteria may be used in determining the final composite score of each individual location, and/or different weights may be assigned to one or more criterion of different criteria. For example, for a presenter participant, the noise level, the echo level, and/or the light characteristics (which include the brightness level), the network signal strength, and/or the network quality may be used in determining the final composite score. Moreover, different weights may be assigned to the noise level, the echo level, the light characteristics, the network signal strength, and/or the network quality. In another example, for a listener participant, noise level may be the most important criterion among other criteria, and accordingly, highest weight may be assigned to the noise level among other criteria that are used in determining the final composite score. In another example, for a host or facilitator participant, noise level, and echo level (noise level, echo) may be the most important criteria and highest weights may be assigned to such criteria among other criteria that are used in determining the final composite score. Other than the examples mentioned above, different combinations of criteria may be used and/or different weights may be assigned to different criterion based on the role of the participant.

The AR map generation tool 532 may generate an AR map for display on the scanning device 500. For example, the AR map may include a depiction of the multiple locations within the physical environment with the final composite score of each locations of the multiple locations.

Moreover, in some implementations, the AR map may include a depiction of the multiple locations and an optimized location of the multiple locations for display on the scanning device 500, either with or without corresponding final composite score.

Figure 6:
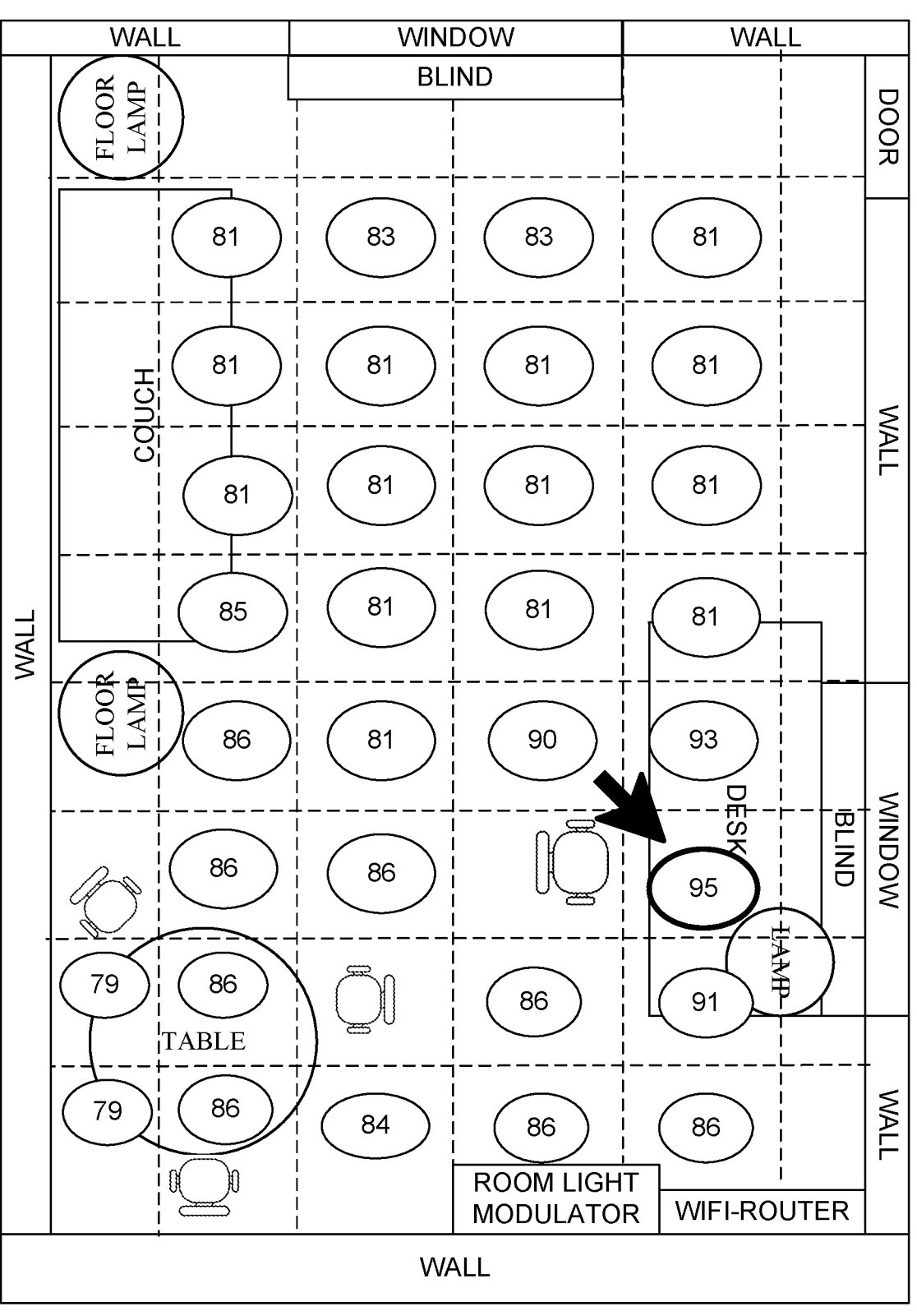
FIG. 6 is an illustration of an example of an augmented reality (AR) map depicting final composite score of each locations.

Moreover, in some implementations, the AR map generation tool 532 may determine the optimized location based on final composite scores for the multiple locations, and depict the optimized location in the AR map. Such AR map with depiction of the final composite score of each locations is illustrated in FIG. 6, with an arrow pointing to the optimized location (e.g., location with a score 95 in FIG. 6).

Moreover, in some implementations, the AR map may display more than one optimized locations on the display based on different potential roles of the participant. For example, the AR map may display three different optimized locations for the presenter participant role, the listener participant role, and the host participant role in one AR map. For example, the AR map may display arrow(s) or other indicator(s) pointing to the optimized location(s) in the physical environment for placing the participant device.

The location optimization software 520 may comprise additional tool(s) which may output assistive action or recommendation. In some implementations, the location optimization software 520 may utilize additional tool to output recommendation (e.g., through speaker(s), user interface, and/or display of the scanning device 500) to move the participant device to the optimized location of the AR map displayed on the scanning device 500.

In some implementations, during the sensor data collection process (e.g., when a user of the scanning device 500 moves to the multiple locations within the physical environment to collect sensor data) or after the sensor data is collected, the location optimization software 520 may utilize additional tool to output the recommendation (e.g., through speaker(s), user interface, and/or display of the scanning device 500) to perform certain actions to obtain or re-obtain the sensor data (e.g., from the sensor(s) 502). For example, the recommendation to perform certain actions may include recommendation to move blind up or down, move away from the wall to prevent echo, manually adjust light level of the room by adjusting lamp or turning on or off the room lights, etc. After the recommendation is output and the certain actions (e.g., moving blind up or down, moving away from the wall, manually adjust room light level, etc.) are performed by the user of the scanning device 500, the sensor data may be obtained or re-obtained. When the sensor data is re-obtained, the location optimization software 520 may process previously obtained sensor data (e.g., prior to performing certain actions, previously stored sensor data) and re-obtained sensor data, and compare these two or more sets of processed sensor data to generate multiple AR maps for comparison, where each of the multiple AR maps is associated certain respective setting (e.g., overall room lighting level, blind position) at which the sensor data was obtained or re-obtained. Moreover, based on comparison of the multiple AR maps, the location optimization software 520 may select one of the multiple AR maps as the best or optimized AR map that includes the optimized location with highest relative final composite score among the multiple AR maps, and output recommendation to the scanning device 500. The recommendation may indicate the user to perform certain actions first (e.g., actions described above such as move blind up or down to certain point, manually adjust light level of the room to certain level) that corresponds to conditions corresponding to the best or optimized AR map, before putting the participant device to the optimized location included in the best or optimized AR map.

In some implementations, prior to processing the sensor data (e.g., by the location optimization software 520), the sensor data collected from the sensor(s) 502 of the scanning device 500 may be synchronized and/or standardized into standardized data format. Such standardization may make it easier for the location optimization software 520 to process diverse sensor data without having to deal with multiple data formats. For example, standardizing may involve converting the sensor data into a common file format, such as Comma-Separated Values (CSV), JavaScript Object Notation (JSON), extensible Markup Language (XML), or a specific binary format.

In some implementations, data indicative of the optimized location in connection with a geolocation of the physical environment and/or certain settings (e.g., overall room lighting level, blind position) at which the sensor data was obtained or re-obtained may be stored in a memory of the scanning device 500, the participant device, and/or the server (such as one of the servers of the datacenter 106, meeting server, web server, or another server as described above) for use during a future video conference.

In some implementations, the scanning device 500 may be the participant device. For example, the scanning device 500 and the participant device may be a single mobile device (e.g., a smartphone, smartphone, a tablet computer, or a laptop computer) equipped with the sensor(s) 502, in which the single mobile device can execute the location optimization software 520 to process sensor data collected from the sensor(s) 502 to determine the optimized location for itself to be placed to participate in the video conference. As such, when the scanning device 500 is the participant device, the scanning device 500 can be used to both determine the optimized location for itself (the scanning device 500) to be placed at and participate in the video conference at that optimized location. For example, when the scanning device 500 is a laptop equipped with the sensor(s) 502, a user of the laptop or the meeting participant can walk around the room with the laptop and scan the room to collect sensor data, and the location optimization software 520 can process the sensor data to generate an AR map with an optimized location in the room for display at a screen of the laptop. For example, when the scanning device 500 is a smartphone equipped with the sensor(s) 502, a user of the smartphone or the meeting participant can walk around the room with the smartphone and scan the room to collect sensor data, and the location optimization software 520 can process the sensor data to generate an AR map with an optimized location in the room for display at a screen of the smartphone.

FIG. 6, as described above, is an illustration of an example of an AR map depicting final composite score of each locations, with an arrow pointing to the optimized location. In this figure, the optimized location corresponds to a location on a desk with highest score of 95. The optimized location has achieved the highest score in this figure based on ambient qualities represented by or included in sensor data (such as the sensor data obtained from the sensor(s) 502). The ambient qualities that are used toward scoring each locations in this scenario of FIG. 6 include a brightness level, a network signal strength, and a noise level. For example, the highest score of 95 in this scenario can be attributed to a combination of location being in close proximity with a lamp and a Wi-Fi router, and not being too close to a corner of the room or a wall where the noise level and/or echo level can be high.

Such AR map may be output and displayed on the scanning device 500 as the assistive action or the recommendation to place the participant device to the optimized location, as described above with respect to FIG. 5. In some implementations, the location optimization software 520 may utilize additional tool to output recommendation (e.g., through speaker(s), user interface, and/or display of the scanning device 500) to place the participant device to the optimized location depicted in the AR map that is displayed on the scanning device 500.

Moreover, in some implementations, the AR map may include a depiction of the multiple locations and an optimized location of the multiple locations for display on the scanning device 500, either with or without corresponding final composite score.

Moreover, in some implementations, the AR map may display more than one optimized locations on the display based on different potential roles of the participant. For example, the AR map may display three different optimized locations for the presenter participant role, the listener participant role, and the host participant role in one AR map. For example, the AR map may display multiple arrows or other indicators pointing to the multiple optimized locations (based on the different potential roles or candidate roles of the participant) in the physical environment for placing the participant device.

Figure 7:
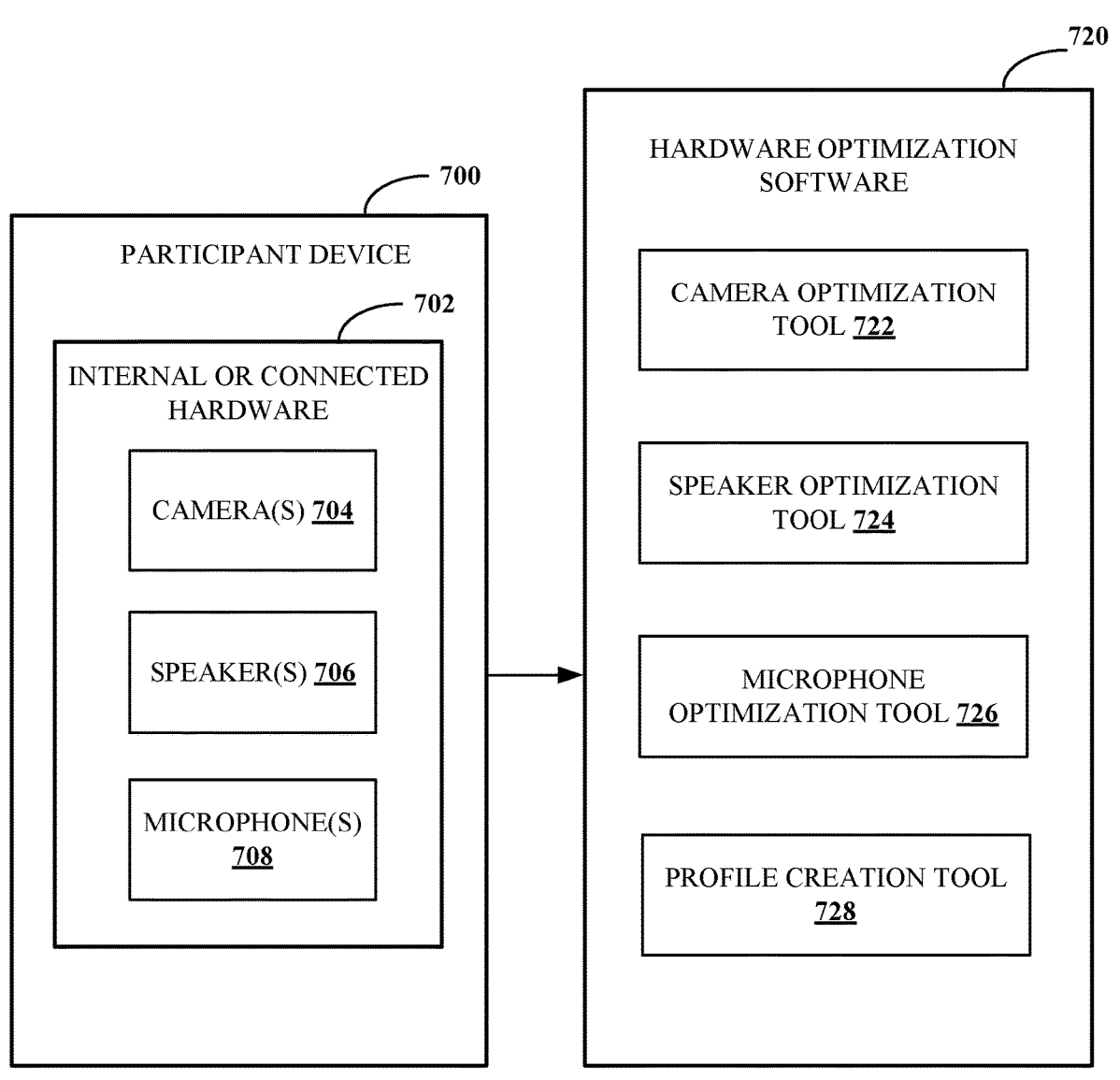
FIG. 7 is a block diagram of an example of a hardware optimization system for optimizing hardware associated with a device utilized for participation in a video conference at an optimized location.
Figure 8:
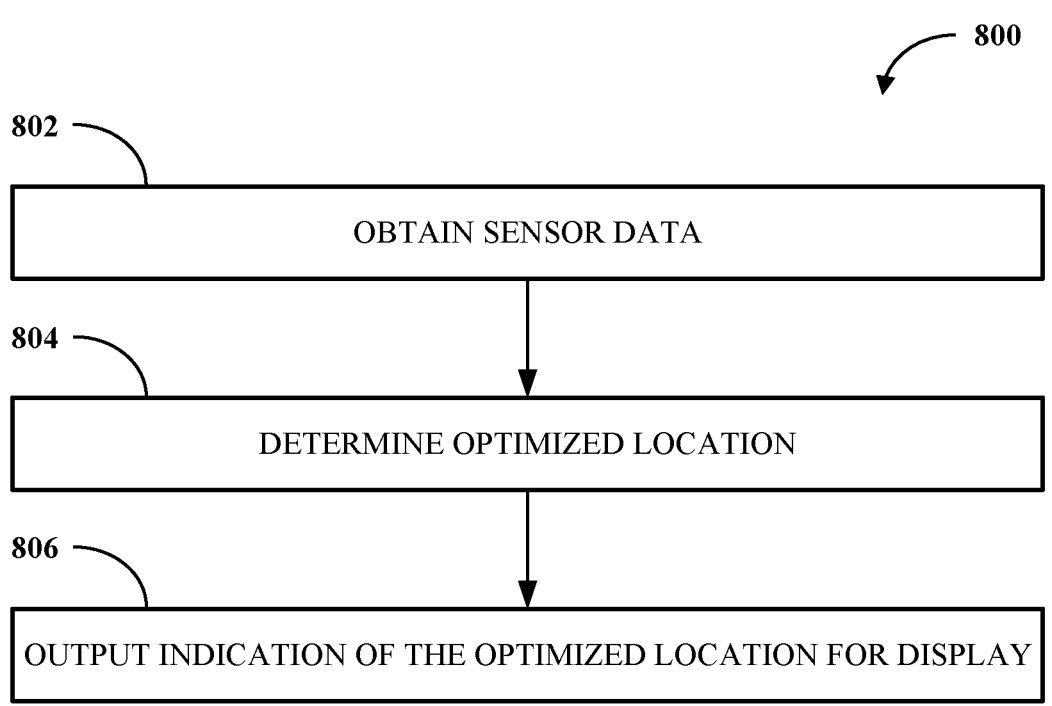
FIG. 8 is a flowchart of an example of a technique for determining an optimized location of a device utilized for participation in a video conference.
Figure 9:
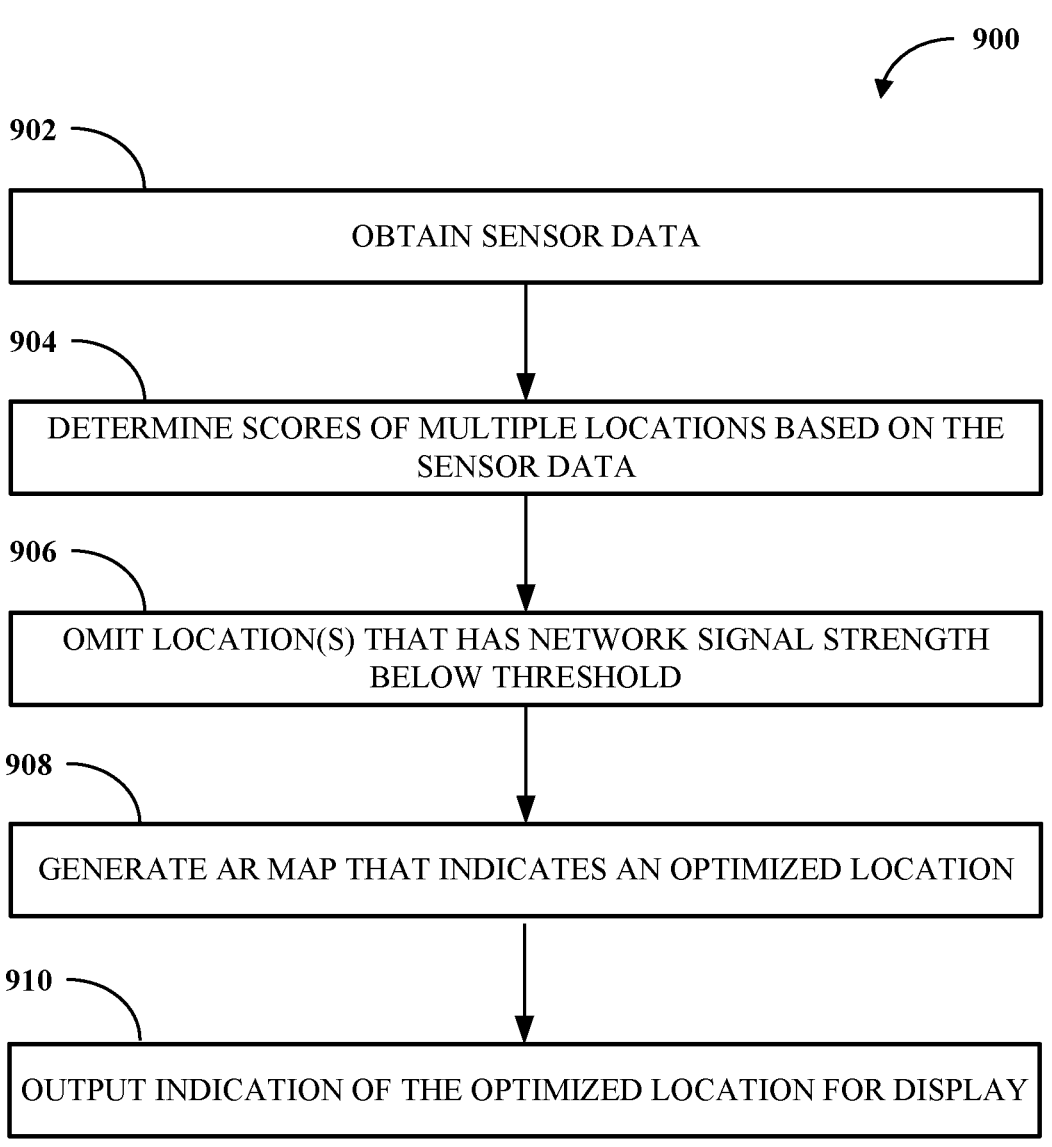
FIG. 9 is a flowchart of an example of a technique for determining an optimized location of a device utilized for participation in a video conference and generating an AR map that indicates the optimized location.

FIG. 7 is a block diagram of an example of a hardware optimization system for optimizing hardware (such as camera(s) 704, speaker(s) 706, and microphone(s) 708) associated with a participant device 700 utilized for participation in a video conference after the participant device 700 is placed in an optimized location (e.g., the optimized location described in FIGS. 5, 8, and 9).

The hardware optimization system may detect internal or connected hardware 702 of the participant device 700 and utilize a hardware optimization software 720 to configure settings of the internal or connected hardware based on location of the participant device 700. For example, after the participant device 700 is placed in the optimized location, the hardware optimization software 720 may be used to determine a combination of respective camera, respective speaker(s), and respective microphone (among the one or more of camera(s) 704, the speaker(s) 706, and/or microphone(s) 708) based on specifications associated with performance of each respective hardware and/or user preferences at that particular optimized location. Moreover, after such combination is determined, the hardware optimization software 720 may be used to determine settings of adjustable parameters associated with the respective camera, the respective speaker(s), and the respective microphone, and configure the settings of the respective camera, the respective speaker(s), and the respective microphone according to determined settings of adjustable parameters.

The participant device 700 may be one of the computing device 200, the computer 306, the mobile device 308, or the shared device 310. In some implementations, the participant device 700 may be the scanning device 500.

The participant device 700 may include internal or connected hardware 702. The internal or connected hardware 702 may include one or more of the camera(s) 704, the speaker(s) 706, and the microphone(s) 708. The camera(s) 704 may include one or more of internal camera(s) and/or external camera(s) that are communicatively connected (e.g., wirelessly connected, wired, electrically connected) to the participant device 700. The speaker(s) 706 may include one or more of internal speaker(s) and/or external speaker(s) that are communicatively connected to the participant device

700. The microphone(s) 708 may include one or more of internal microphone(s) and/or external microphone(s) that are communicatively connected to the participant device 700.

The hardware optimization software 720 may include tools, such as programs, subprograms, functions, routines, subroutines, operations, executable instructions, and/or the like for, inter alia and as further described below, determining the optimized hardware for the participant device 700 utilized for participation in the video conference.

At least some of the hardware optimization software 720 can be implemented as respective software programs that may be executed by the participant device 700. A software program can include machine-readable instructions that may be stored in a memory (such as the memory of the participant device 700), and that, when executed by the processor, may cause the participant device 700 to perform the instructions of the software program. As shown, the hardware optimization software 720 may include a camera optimization tool 722, a speaker optimization tool 724, a microphone optimization tool 726, and a profile creation tool 728. In some implementations, the hardware optimization software 720 can include more or fewer tools. In some implementations, some of the tools may be combined, some of the tools may be split into more tools, or a combination thereof. In some implementations, the hardware optimization software 720 may run on the server, or both the participant device 700 and the server.

As described above, the hardware optimization software 720 may be used to determine optimized hardware settings for the participant device 700 (e.g., when the participant device 700 is used to participate in the video conference) after the participant device 700 is placed in the optimized location (e.g., the optimized location described in FIGS. 5, 8, and 9). For example, the hardware optimization software 720 may be used to determine the combination of the respective camera, the respective speaker(s), and the respective microphone (among the camera(s) 704, the speaker(s) 706, and the microphone(s) 708) based on specifications associated with performance of each respective hardware and/or user preferences at that particular optimized location. Moreover, after such combination is determined, the hardware optimization software 720 may be used to determine settings of adjustable parameters associated with the respective camera, the respective speaker(s), and the respective microphone, and configure the settings of the respective speaker(s), and the respective microphone according to determined settings of adjustable parameters. For example, the optimized location may be a location within a room of a house, an apartment, an office, or other building.

Determining the optimized hardware settings for the participant device 700 may include, in addition to detecting the internal or connected hardware 702, analyzing hardware specification associated with performance of each respective hardware among the internal or connected hardware 702, and/or interacting with a user of the participant device 700 to determine the optimized hardware settings for the participant device 700 at that particular location (e.g., the optimized location). Determining the optimized hardware settings for the participant device 700 at the optimized location may include determining and/or selecting a combination of a respective camera, a respective microphone, and/or respective speaker(s) (among the internal or connected hardware 702) to be used for participating in the video conference.

Moreover, determining the optimized hardware settings for the participant device 700 may include creating a profile of respective optimized hardware settings for that particular optimized location. That is, the profile of the respective optimized hardware settings may differ depending on at which location the user or the participant device 700 is located, whether it be a respective optimized location in the room in the apartment, respective optimized location in the office, etc. For example, the optimized location at the office may have different types of external equipment (e.g., the camera(s) 704, the speaker(s) 706, and the microphone(s) 708, etc.) at different arrangement than external equipment at the apartment room, in case there are external equipment. Moreover, for example, the optimized location at the office may have different optimal microphone setting, speaker setting, or camera setting (e.g., microphone sensitivity level, volume level, camera brightness, contrast ratio, or other parameters (e.g., adjustable parameters) associated with the camera(s) 704, speaker(s) 706, and microphone(s) 708) than those of the apartment room. As such, the optimized hardware settings may encompass not only the combination or arrangement of different hardware (both internal and external) at different optimized locations, but also optimized individual hardware settings or hardware parameters for each of the camera(s) 704, speaker(s) 706, and microphone(s) 708.

Creating different profiles depending on the respective optimized locations at different environmental settings (e.g., room in a house, apartment, office, etc.) may be provide benefit and convenience to the user who uses the participant device 700, since the user does not have to determine respective optimized hardware settings for each particular optimized location whenever the user moves to different optimized locations in different environmental settings (e.g., optimized location in the apartment room, the optimized location in the office, etc.). In some implementations, a machine-learning (ML) model (which may also be a deep-learning (DL) model) may be utilized to output the optimized hardware settings for respective optimized location or create a profile of respective optimized hardware settings for that particular optimized location. For example, the ML model may output the optimized hardware settings or the profile corresponding to the optimized hardware settings based on input data (e.g., IP address, data related to location of the participant device, etc.), detected or identified hardware information or combination which may include the internal or connected hardware 702 that are connected to the participant device 700, location data associated with the participant device 700, and/or other data associated with locating the participant device 700).

Moreover, individual tools that may be used in determining the optimized hardware settings for the participant device 700 are further described below.

The camera optimization tool 722 may be used to detect the internal and external cameras (e.g., the camera(s) 704) and determine the optimized settings. Moreover, camera specification such as the resolution of the detected cameras may be compared among detected cameras, and a camera that has the highest resolution specification may be automatically selected as the camera to be used for participation in the video conference. In some implementations, the camera optimization tool 722 may interact or communicate with the user, and the user may manually select the camera to be used for the video conference. Moreover, after selection of the camera to be used for the video conference, the camera optimization tool 722 may automatically adjust or recommend feature settings or parameters associated with selected camera, which can include brightness, contrast ratio, or other features. In some implementations, the camera optimization tool 722 may interact or communicate with the user, and the user may manually adjust the feature settings or parameters associated with the selected camera.

Moreover, selected camera and the camera settings may be stored in a memory of the participant device 700 and/or the server, and may be used toward creating profiles by the profile creation tool 728.

The speaker optimization tool 724 may be used to detect the internal and external speaker(s) (e.g., the speaker(s) 706) and determine the optimized settings. For example, speaker specification such as channel configuration, sample rates, bit depths, latency, connection type, and other specification associated with performance may be compared among detected speaker(s), and speaker(s) that best match certain preference or threshold for participating in the video conference may be automatically selected. In some implementations, the speaker optimization tool 724 may interact or communicate with the user, and the user may manually select the speaker(s) to be used for the video conference. Moreover, after selection of the speaker(s) to be used for the video conference, the speaker optimization tool 724 may automatically adjust or recommend feature settings or parameters associated with selected speaker(s), which can include volume level, equalization settings, or other features. In some implementations, the speaker optimization tool 724 may interact or communicate with the user, and the user may manually adjust the feature settings or parameters associated with the selected speaker(s).

Moreover, the speaker optimization tool 724 may be used to separate usage of the detected or selected speaker(s) based on user preference. For example, depending on the user preference, while a first portion of detected or selected speaker(s) may be used to participate in the video conference, a second portion of detected or selected speaker(s) may be used for different purposes. For example, usage of the detected speaker(s) can be separated such that external set of speakers may be used for streaming YouTube videos while the internal speaker(s) may be used for participating in the video conference. For example, usage of the detected speaker(s) can be separated such that left side of a speaker set may be used for streaming YouTube videos while right side of the speaker set may be used for participating in the video conference. In some implementations, the first portion of detected or selected speaker(s) and the second portion of detected or selected speaker(s) may be used simultaneously. For example, consider a situation where the user may participate in the video conference while streaming YouTube videos at the same time. In such scenario, the first portion of detected or selected speaker(s) may be outputting sound from the video conference while the second portion of detected or selected speaker(s) may be outputting sound from the YouTube videos.

Moreover, selected speaker(s) and the speaker(s) settings may be stored in the memory of the participant device 700 and/or the server, and may be used toward creating profiles by the profile creation tool 728.

The microphone optimization tool 726 may be used to detect the internal and external microphones (e.g., the microphone(s) 708) and determine the optimized settings. For example, microphone specification such as sample rates, bit depths, volume level, gain control, sensitivity, stereo/mono configuration, latency, connection type, and other specification associated with performance among detected microphones may be compared, and a microphone that best matches certain preference or threshold for participating in the video conference may be automatically selected. For example, the microphone optimization tool 726 may access and play or emit random system-generated sound from one of the detected or selected speaker(s) and test performance of each of the microphones, and determine a microphone to be used for the video conference. In some implementations, the microphone optimization tool 726 may interact or communicate with the user. For example, microphone test that requires user voice input may run individually for different microphones and the microphone optimization tool 726, and the user may select the microphone to be used for the video conference. Moreover, after selection of the microphone to be used for the video conference, the microphone optimization tool 726 may automatically adjust or recommend feature settings or parameters associated with selected microphone, which can include volume level, polar patterns, sensitivity, connectivity, frequency response, self-noise, or other features. In some implementations, the microphone optimization tool 726 may interact or communicate with the user, and the user may manually adjust the feature settings or parameters associated with the selected microphone.

Moreover, selected microphone and the microphone settings may be stored in the memory of the participant device 700 and/or the server, and may be used toward creating profiles by the profile creation tool 728.

The profile creation tool 728 may be used to create different profiles at the respective optimized locations. For example, creating different profiles at the respective optimized locations may include creating a combination of selected camera, speaker(s), and/or microphone to be used for participating in the video conference at respective optimized location. For example, creating the different profiles at the respective optimized locations may include creating a profile with a combination of the selected camera, speaker(s), and/or microphone, and/or a combination of corresponding settings (e.g., feature settings, parameter settings) to be used for participating in the video conference at respective optimized location. Moreover, location data associated with the respective optimized locations may also be stored in the profiles. For example, one or more of GPS data, AR map data, motion sensor data and/or orientation data that can determine the orientation and/or location of the participant device 700, and other data related to location can be stored in the profiles. Moreover, for example, an IP address, detected or identified hardware information or combination which may include the internal or connected hardware 702 (that is connected to the participant device 700) may be associated with the respective optimized locations and thus be used in locating the participant device 700, and stored in the profiles. Moreover, the profiles created may be stored in the memory of the participant device 700 or the server.

Based on the created profiles at respective optimized locations, the hardware optimization software 720 may determine and/or automatically select the optimized hardware settings for the participant device 700 based on the respective optimized location. For example, when the user places the participant device 700 at certain optimized location (e.g., the optimized location in the apartment room, the optimized location in the office), and the user chooses a corresponding profile through the participant device 700, the hardware optimization software 720 may configure the internal or connected hardware 702 according to the chosen profile. For example, when the user places the participant device 700 at certain optimized location, the hardware optimization software 720 may automatically detect the certain optimized location based on data associated with the location, and may automatically configure or ask for permission to configure the internal or connected hardware 702 according to the chosen profile. For example, the data associated with the location may include IP address, detected or identified hardware information or combination which may include the internal or connected hardware 702 that is connected to the participant device 700, the location data associated with the participant device 700 (e.g., any location data stored in the profiles), and/or other data associated with locating the participant device 700.

In some implementations, the ML model may be utilized to output or automatically configure the optimized hardware settings for respective optimized location based on input data (e.g., IP address, detected or identified hardware information or combination which may include the internal or connected hardware 702 that is connected to the participant device 700, location data associated with the participant device 700, and/or other data associated with locating the participant device 700).

Even though the example of operations associated with optimizing hardware associated with the participant device 700 are described to be performed after the participant device 700 is placed in the optimized location, such example of operations may be performed at locations suitable to participate in the video conference, other than the optimized location.

To further describe some implementations, reference is next made to examples of techniques which may be performed by or using a system for determining an optimized location of the participant device. FIG. 8 is a flowchart of an example of a technique 800 for determining the optimized location of the participant device. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, sensor data is obtained. The sensor data may be obtained by a scanning device (e.g., the scanning device 500) or a device equipped with one or more sensors capable of obtaining sensor data representing or including ambient qualities of multiple locations within a physical environment, a processor to process such sensor data that represent the ambient qualities of the multiple locations, and determine the optimized location of the participant device.

For example, the one or more sensors may include camera(s) (e.g., video camera), ambient light sensor(s), depth sensor(s), microphone(s), speaker(s), modem(s), antenna(s), Wi-Fi module(s), ultrasonic sensor(s), sonar sensor(s), motion sensor(s) (e.g., accelerometer, gyroscope), magnetometer(s), and/or GPS.

The sensor data may include or be equivalent to the sensor data (obtained from the sensor(s) 502) as described with respect to FIG. 5. For example, the sensor data may include data associated with images and/or video of or which capture the multiple locations in the physical environment, brightness level and/or directions of light, ambient sound (e.g., which may be used to extract noise level, echo, etc.), network signal strength, network quality etc. For example, the sensor data may include at least one of video data, image data, light intensity data, ambient sound data, or Wi-Fi signal data. For example, the user of the scanning device may utilize the scanning device to take a video, photos, and/or scan the room. For example, the sensor data may be obtained or collected at multiple locations within the room while the user is moving around the room.

In some implementations, obtaining the sensor data may involve the user of the scanning device interacting with a location optimization software (e.g., the location optimization software 520) to optimize the conditions (for participating in the video conference prior to determination of the optimized location, or for determining the optimized location) and/or facilitate the sensor data collection process. For example, during the sensor data collection process (e.g., when the user of the scanning device moves to the multiple locations within the physical environment to collect sensor data) or after the sensor data is collected, the location optimization software may output recommendation (e.g., through speaker(s), user interface, and/or display of the scanning device) to perform certain actions to obtain or re-obtain the sensor data. For example, the recommendation to perform certain actions may include recommendation to move blind up or down, move away from the wall to prevent echo, manually adjust light level of the room by adjusting lamp or turning on or off the room lights, etc. After the recommendation is output and certain actions are performed by the user, the sensor data may be obtained or re-obtained.

In some implementations, the participant device may be the scanning device.

At 804, the optimized location is determined based on the sensor data. For example, determining the optimized location may include comparing one or more of the ambient qualities (e.g., noise level, the network signal strength, the brightness level, the direction of light, etc.) at a respective location to the ambient qualities at other respective locations within the physical environment, and determining a location with the highest optimality to set up the participant device for participation in the video conference.

In some implementations, data indicative of the optimized location in connection with a geolocation of the physical environment may be stored in a memory of the scanning device, the participant device, and/or the server (such as one of the servers of the data center 66, meeting server, web server, or another server as described above) for use during a future video conference.

In some implementations, the participant device may be the scanning device.

At 806, an indication of the optimized location is output on a display of the scanning device. For example, prior to start of the video conference, the optimized location may be depicted in a map, an image, or other illustrations that can illustrate at least a portion of spatial arrangement or spatial aspect of the physical environment. For example, during the video conference (and/or prior to the participant (that uses the participant device) joining the video conference), the optimized location may be depicted in a map, an image, or other illustrations that can illustrate at least a portion of spatial arrangement or spatial aspect of the physical environment. For example, the optimized location may be depicted in the AR map (e.g., generated by the location optimization software) on the display of the scanning device. In some implementations, recommendation can be output (e.g., through speaker(s), user interface, and/or display of the scanning device 500) to move the participant device to the optimized location depicted in the AR map. In some implementations, the participant device may be the scanning device.

FIG. 9 is a flowchart of an example of a technique 900 for determining the optimized location of the participant device and generating an AR map that indicates the optimized location. The technique 900 can be executed using computing devices, such as the systems, hardware, and software described with respect to FIGS. 1-7. The technique 900 can be executed in conjunction with the technique 800 of FIG. 8. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

At 902, sensor data is obtained. The sensor data may be obtained in a similar manner as described with respect to step 802 of FIG. 8 and the sensor data obtained from the sensor(s) 502 of FIG. 5, so the technique will not be repeated here.

At 904, scores of the multiple locations within the physical environment are determined. For example, the score may correspond to a score or a priority level that represents the optimality (or degree of optimality) of each location to set up the participant device for the participation in the video conference. For example, the score or a final composite score of each individual location of the multiple locations may be based on one or more of noise level, echo level, light characteristics, network signal, network strength, or the red flag items, as described above with respect to FIG. 5. For example, respective score may be assigned to each criterion (e.g., noise level, echo level, light characteristics, network signal, and network strength) at respective location, each criterion may be assigned a weight based on its importance (e.g., pre-determined importance) to the video conference, and weighted sum of all criteria can be used to determine the final composite score of the respective location. Moreover, depending on the type of the red flag item present, weighted sum can be reduced to a certain pre-determined amount (e.g., minus 10 points in a 100 point scale when the is microwave oven is nearby and depending on how far (e.g., 1.5 meters away) the microwave oven is located from that location, more points can be deducted, minus 7 points when there is a sharp edge of furniture that is 1 meter away from that location, minus 10 points when the sharp edge of the furniture is 0.5 meter away from that location, etc.) in determining the final composite score of the respective location. In similar manner, the final composite score can be determined for multiple locations within the physical environment.

At 906, a location that has network signal strength below threshold is omitted. For example, the threshold may be a predefined value or limit used to determine quality of the signal. If the signal strength is below this threshold, it may be considered too weak or unreliable for effective communication over the video conference.

At 908, an AR map that indicates or includes the optimized location is generated. The AR map that indicates the optimized location may be generated in a similar manner as described with respect to step 806 of FIG. 8 and the location optimization software 520 of FIG. 5, so the technique will not be repeated here.

At 910, an indication of the optimized location is output on a display of the scanning device. For example, the optimized location may be depicted in the AR map on the display of the scanning device. In some implementations, recommendation can be output (e.g., through speaker(s), user interface, and/or display of the scanning device 500) to move the participant device to the optimized location depicted in the AR map. In some implementations, the participant device may be the scanning device.

Figure 10:
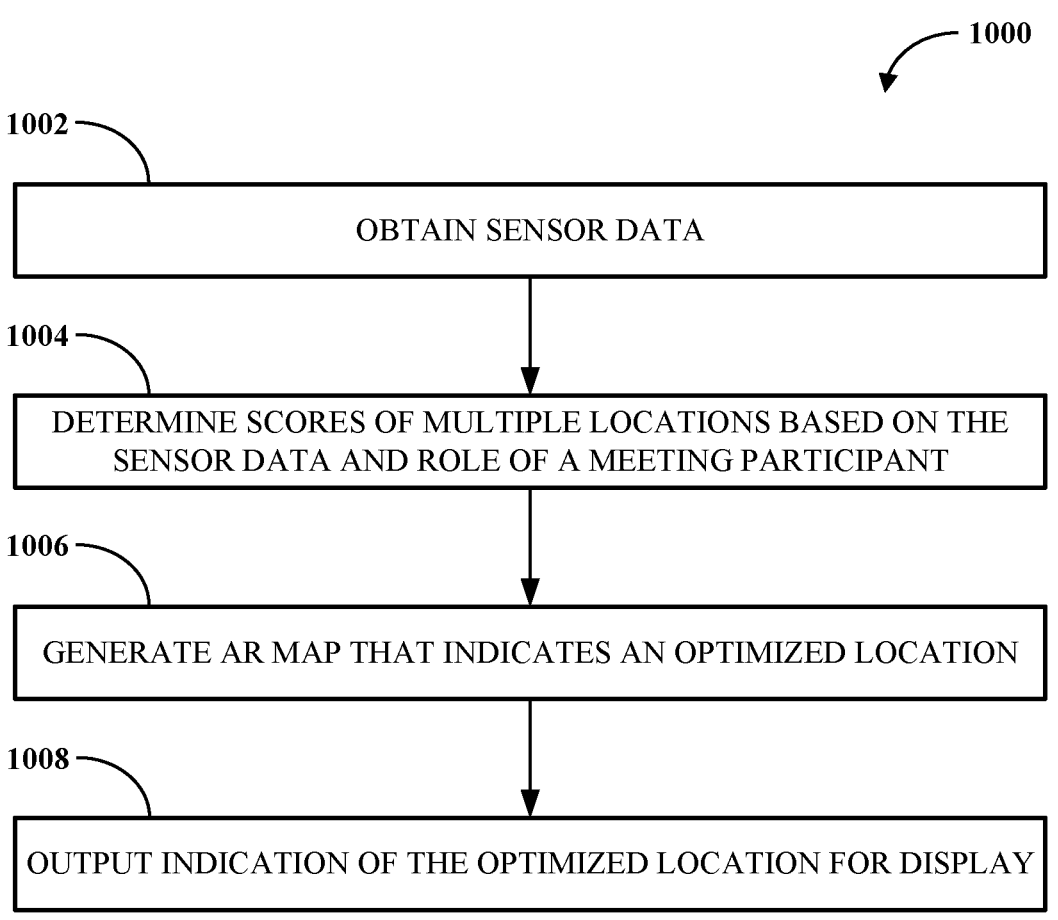
FIG. 10 is a flowchart of an example of a technique for determining an optimized location of a device utilized for participation in a video conference based on a role of a meeting participant and generating an AR map that indicates the optimized location.

FIG. 10 is a flowchart of an example of a technique 1000 for determining the optimized location of the participant device based on a role of a meeting participant and generating an AR map that indicates the optimized location. The technique 1000 can be executed using computing devices, such as the systems, hardware, and software described with respect to FIGS. 1-7. The technique 1000 can be executed in conjunction with the technique 800 of FIG. 8 and the technique 900 of FIG. 9. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

At 1002, sensor data is obtained. The sensor data may be obtained in a similar manner as described with respect to step 802 of FIG. 8 and the sensor data (obtained from the sensor(s) 502) of FIG. 5, so the technique will not be repeated here.

At 1004, scores of the multiple locations within the physical environment are determined based on the sensor data and role of a meeting participant. For example, the score may correspond to a score or a priority level that represents the optimality (or degree of optimality) of each location to set up the participant device for the participation in the video conference. For example, the score or a final composite score of each individual location of the multiple locations may be based on one or more of noise level, echo level, light characteristics, network signal, network strength, or the red flag items, as described above with respect to FIG. 5. For example, respective score may be assigned to each criterion (e.g., noise level, echo level, light characteristics, network signal, and network strength) at respective location, each criterion may be assigned a weight based on its importance (e.g., pre-determined importance) to the video conference, and weighted sum of all criteria can be used to determine the final composite score of the respective location. Moreover, depending on the type of the red flag item present, weighted sum can be reduced to a certain pre-determined amount (e.g., minus 10 points in a 100 point scale when there is microwave oven nearby and depending on how far (e.g., 1.5 meters away) the microwave oven is located from that location, more points can be deducted, minus 7 points when there is a sharp edge of furniture that is 1 meter away from that location, minus 10 points when the sharp edge of the furniture is 0.5 meter away from that location, etc.) in determining the final composite score of the respective location. In similar manner, the final composite score can be determined for multiple locations within the physical environment.

Moreover, determining what criterion(s) is to be used to determine the final composite score of each individual location may include determining a role of the participant who uses the participant device to participate in the video conference. For example, depending on different types of roles of the participant, different criteria may be used in determining the final composite score of each individual location, and/or different weights may be assigned to different criteria. For example, for a presenter participant, the noise level, the echo level, and/or the light characteristics (which include the brightness level), the network signal strength, and/or the network quality may be used in determining the final composite score. Moreover, different weights may be assigned to the noise level, the echo level, the light characteristics, the network signal strength, and/or the network quality. In another example, for a listener participant, noise level may be the most important criterion among other criteria, and highest weight may be assigned to the noise level among other criteria that are used in determining the final composite score. In another example, for a host or facilitator participant, noise level, and echo level (noise level, echo) may be the most important criteria and highest weights may be assigned to such criteria among other criteria that are used in determining the final composite score. Other than the examples mentioned above, different combinations of criteria may be used and/or different weights may be assigned to different criterion based on the role of the participant.

Moreover, a location that has network signal strength below threshold can be omitted. Such location can be omitted in a similar manner as described with respect to step 906 of FIG. 9, so the technique will not be repeated here.

At 1006, an AR map that indicates or includes the optimized location is generated. For example, the optimized location may be depicted in the AR map (e.g., generated by the location optimization software) on the display of the scanning device. In some implementations, Such AR map may be generated in a similar manner as described with respect to step 908 of FIG. 9 and the location optimization software 520 of FIG. 5, so the technique will not be repeated here.

At 1008, an indication of the optimized location is output on a display of the scanning device. Such indication of the optimized location may be output in a similar manner as described with respect to step 910 of FIG. 9 and the location optimization software 520 of FIG. 5, so the technique will not be repeated here.

Figure 11:
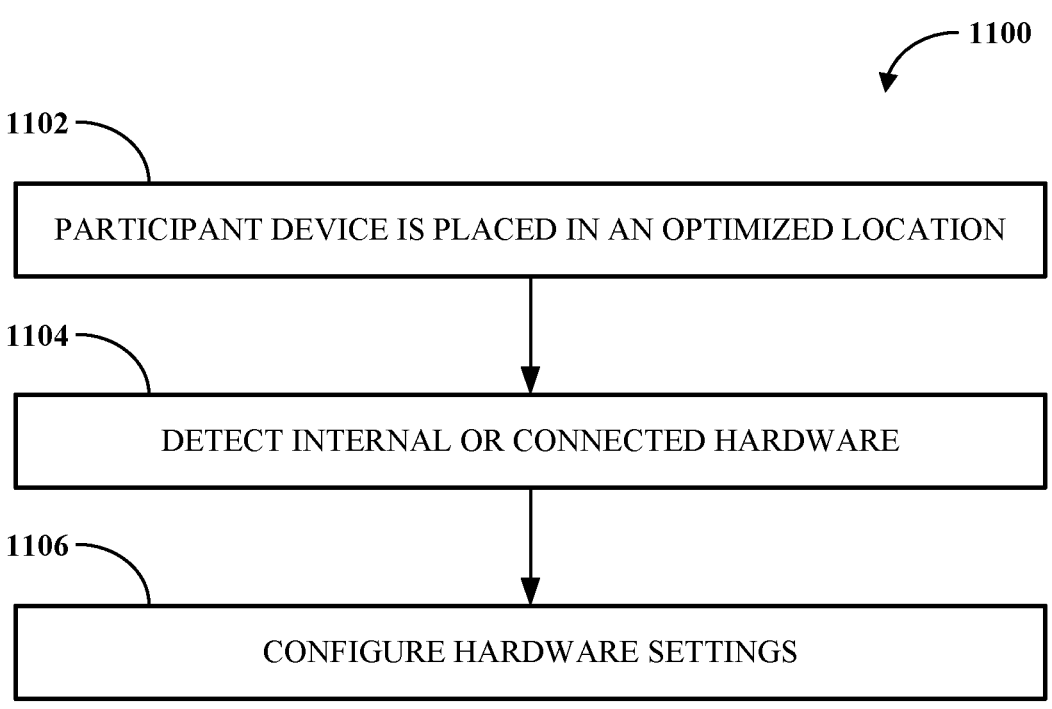
FIG. 11 is a flowchart of an example of a technique for configuring hardware settings (such as camera settings, speaker settings, and microphone settings) after determining an optimized location.

FIG. 11 is a flowchart of an example of a technique 1100 for configuring hardware settings to optimized hardware settings (such as camera settings, speaker settings, and microphone settings) after determining an optimized location. The technique 1100 can be executed using computing devices, such as the systems, hardware, and software described with respect to FIGS. 1-7. The technique 1100 can be executed in conjunction with the technique 800 of FIG. 8, the technique 900 of FIG. 9, and the technique 1000 of FIG. 10. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof.

At 1102, a participant device is placed in an optimized location for participating in a video conference. The optimized location may be the location that is determined as a result of conducting technique 800 of FIG. 8, the technique 900 of FIG. 9, and the technique 1000 of FIG. 10.

At 1104, internal or connected hardware (e.g., the internal or connected hardware 702) of the participant device is detected. The internal or connected hardware may include internal or external camera(s), speaker(s), and microphone(s). For example, the internal or connected hardware may be detected by utilizing a software, such as the hardware optimization software 720 of FIG. 7.

At 1106, hardware settings are configured to the optimized hardware settings. Configuring the hardware settings to the optimized hardware settings may include configuring the optimized hardware settings based on the optimized location where the participant device is placed.

For example, after the participant device 700 is placed in the optimized location, a combination of respective camera, respective speakers, and/or respective microphone (among the internal or external camera(s), speaker(s), and/or microphone(s) that are detected) based on specifications associated with performance of each respective hardware and/or user preferences at that particular optimized location in accordance with implementations described with respect to the hardware optimization software 720 of FIG. 7. Moreover, after such combination is determined, settings of adjustable parameters associated with the respective camera, the respective speaker(s), and/or the respective microphone can be determined, and the respective camera, the respective speaker(s), and/or the respective microphone can be configured according to determined settings of adjustable parameters (e.g., brightness, contrast ratio, volume level, equalization settings, polar patterns, sensitivity, connectivity, frequency response, self-noise, or other features associated with control settings of the camera, the speaker(s), and/or the microphone).

In some implementations, the optimized hardware settings may be the optimized settings corresponding to the hardware settings of created and/or stored profile at the optimized location in accordance with implementations described with respect to the hardware optimization software 720 of FIG. 7. For example, the optimized hardware settings may correspond to a stored combination of the selected camera, speaker(s), and/or microphone at the optimized location. For example, the selected camera may be a camera that is optimized (e.g., based on camera specification such as resolution and/or user preference) at such optimized location. For example, the selected speaker(s) may be speaker(s) that are optimized (e.g., based on speaker specification and/or user preference) at such optimized location. For example, the selected microphone may be a microphone that is optimized (e.g., based on microphone specification and/or user preference) at such optimized location. Moreover, selected camera, speaker(s), and/or microphone may have adjusted feature settings or parameters that are based on system recommendations and/or user preferences or inputs, as described with respect to the hardware optimization software 720 of FIG. 7.

For example, the hardware optimization software 720 may automatically detect the certain optimized location based on data associated with the location, and may automatically configure or ask for permission to configure the internal or connected hardware according to the profile. For example, the data associated with the location may include IP address, detected or identified hardware information or combination which may include the internal or connected hardware, location data associated with the participant device, and/or other data associated with locating the participant device.

In some implementations, the ML model may be utilized to output or automatically configure the optimized hardware settings for respective optimized location based on input data (e.g., IP address, detected or identified hardware information or combination which may include the internal or connected hardware, location data associated with the participant device, and/or other data associated with locating the participant device).

The implementations of this disclosure correspond to methods, non-transitory computer readable media, apparatuses, systems, devices, and the like. In some implementations, a method comprises identifying, during a video conference, multiple video layers of a video stream obtained from a first participant device connected to the video conference; detecting, during the video conference, an interaction with an object within one of the multiple video layers from a second participant device connected to the video conference; and presenting, during the video conference, information associated with the object within a graphical user interface associated with the video conference based on the interaction. In some implementations, a non-transitory computer readable medium stores instructions operable to cause one or more processors to perform operations comprising obtaining, by a device within a physical environment, sensor data including ambient qualities of multiple locations within the physical environment; determining, based on the sensor data and from amongst the multiple locations, a location within the physical environment at which to place a participant device to connect to a video conference; and outputting an indication of the location for display at the device. In some implementations, a system comprises: a device configured to obtain sensor data that include ambient qualities of multiple locations within a physical environment; determine, based on the sensor data and from amongst the multiple locations, a location within the physical environment at which to place a participant device to connect to a video conference; and output an indication of the location for display at the device; and the participant device.

In some implementations of the method, non-transitory computer readable medium, or system, the sensor data includes at least one of video data, image data, light intensity data, audio data, or Wi-Fi signal data.

In some implementations of the method, non-transitory computer readable medium, or system, the ambient qualities include noise levels, and determining the location comprises determining scores for each of the multiple locations based on the noise levels and identifying the location as a respective location of the multiple locations having a highest one of the scores.

In some implementations of the method, non-transitory computer readable medium, or system, the ambient qualities include network signal strength, and determining the location comprises omitting a respective location of the multiple locations in response to determining that the network signal strength is below a threshold.

In some implementations of the method, non-transitory computer readable medium, or system, the ambient qualities include brightness levels and directions of light, and determining the location comprises determining scores for each of the multiple locations based on the brightness levels and the directions of light and identifying the location as a respective location of the multiple locations having a highest one of the scores.

In some implementations of the method, non-transitory computer readable medium, or system, the location is determined based on priorities of the ambient qualities relative to a role of a meeting participant of the video conference.

In some implementations of the method, non-transitory computer readable medium, or system, outputting the indication of the location for display at the device comprises generating an augmented reality map of the physical environment and depicting the location within the augmented reality map.

In some implementations of the method, non-transitory computer readable medium, or system, the method comprises, the operations comprise, and the processor is configured to execute the instructions for storing data indicative of the location in connection with a geolocation of the physical environment for use during a future video conference.

In some implementations of the method, non-transitory computer readable medium, or system, the participant device is the device.

In some implementations of the method, non-transitory computer readable medium, or system, determining the location comprises detecting a presence of an item that can reduce a video quality or an audio quality of the video conference within the physical environment; determining scores for each of the multiple locations based on the ambient qualities and the presence of the item; and identifying the location as a respective location of the multiple locations having a highest one of the scores.

In some implementations of the method, non-transitory computer readable medium, or system, determining the location comprises determining scores for each of the multiple locations based on the ambient qualities and a role of a meeting participant; and identifying the location as a respective location of the multiple locations having a highest one of the scores.

In some implementations of the method, non-transitory computer readable medium, or system, outputting the indication of the location for display at the device comprises generating an augmented reality map of the physical environment; and depicting multiple locations based on different candidate roles of a meeting participant within the augmented reality map.

In some implementations of the method, non-transitory computer readable medium, or system, the method comprises, the operations comprise, and the processor is configured to execute the instructions for determining settings for a camera, one or more speakers, or a microphone that are internal or connected to the participant device at the location; and configuring the camera, the one or more speakers, or the microphone based on the settings.

In some implementations of the method, non-transitory computer readable medium, or system, the method comprises, the operations comprise, and the processor is configured to execute the instructions for determining settings for a camera, one or more speakers, or a microphone that are internal or connected to the participant device at the location; creating a profile based on the settings; and configuring the camera, the one or more speakers, or the microphone according to the profile.

In some implementations of the method, non-transitory computer readable medium, or system, the method comprises, the operations comprise, and the processor is configured to execute the instructions for separating usage of speakers that are internal or connected to the participant device at the location, wherein a first portion of the speakers is used for participating in the video conference and a second portion of the speakers is used for a different usage.

In some implementations of the method, non-transitory computer readable medium, or system, the participant device is configured to detect internal and external cameras and speakers associated with the participant device; determine, based on specifications associated with performance of each respective camera and each respective speaker of the internal and external cameras and speakers, a combination of a camera and one or more speakers to be used for participating in the video conference; and use the combination for participating in the video conference.

In some implementations of the method, non-transitory computer readable medium, or system, the participant device is configured to detect internal and external cameras and speakers associated with the participant device; determine, based on specifications associated with performance of each respective camera and each respective speaker of the internal and external cameras and speakers, a camera and one or more speakers to be used for participating in the video conference; determine, based on a user preference, control parameters of the camera and the one or more speakers; and use the control parameters of the camera and the one or more speakers for participating in the video conference.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
obtaining, by a device within a physical environment, sensor data including ambient qualities of multiple locations within the physical environment, wherein the ambient qualities include brightness levels and directions of light;
determining, by the device and based on the sensor data and from amongst the multiple locations, a location within the physical environment at which to place a participant device to connect to a video conference, wherein determining the location comprises:
determining scores for each of the multiple locations based on the brightness levels and the directions of light; and
identifying, based on comparing the scores, the location as a respective location of the multiple locations; and
outputting, by the device, an indication of the location for display at the device.

2. The method of claim 1, wherein the sensor data includes at least one of video data, image data, light intensity data, audio data, or Wi-Fi signal data.

3. The method of claim 1, wherein the ambient qualities include noise levels, and wherein the scores the scores for each of the multiple locations are based on the noise levels.

4. The method of claim 1, wherein the ambient qualities include network signal strength, and wherein determining the location comprises:
omitting a respective location of the multiple locations in response to determining that the network signal strength is below a threshold.

5. The method of claim 1, wherein the ambient qualities include network signal strengths, and wherein the scores for each of the multiple locations are based on the network signal strengths.

6. The method of claim 1, wherein the location is determined based on priorities of the ambient qualities relative to a role of a meeting participant of the video conference.

7. The method of claim 1, wherein outputting the indication of the location for display at the device comprises:
generating an augmented reality map of the physical environment; and
depicting the location within the augmented reality map.

8. The method of claim 1, comprising:
storing data indicative of the location in connection with a geolocation of the physical environment for use during a future video conference.

9. The method of claim 1, wherein the participant device is the device.

10. A non-transitory computer readable medium storing instructions operable to cause one or more processors to perform operations comprising:
obtaining, by a device within a physical environment, sensor data including ambient qualities of multiple locations within the physical environment, wherein the ambient qualities include brightness levels and directions of light;
determining, based on the sensor data and from amongst the multiple locations, a location within the physical environment at which to place a participant device to connect to a video conference, wherein determining the location comprises:

determining scores for each of the multiple locations based on the brightness levels and the directions of light; and identifying, based on comparing the scores, the location as a respective location of the multiple locations; and outputting an indication of the location for display at the device.

11. The non-transitory computer readable medium of claim 10, wherein determining the location comprises:

detecting a presence of an item that can reduce a video quality or an audio quality of the video conference within the physical environment, wherein the scores for each of the multiple locations are based on the presence of the item.

12. The non-transitory computer readable medium of claim 10, wherein determining the location comprises:

detecting a presence of an item that can pose a health concern to a meeting participant within the physical environment, wherein the scores for each of the multiple locations are based on the presence of the item.

13. The non-transitory computer readable medium of claim 10, wherein the scores for each of the multiple locations are based on a role of a meeting participant.

14. The non-transitory computer readable medium of claim 10, wherein outputting the indication of the location for display at the device comprises:

generating an augmented reality map of the physical environment; and depicting multiple locations based on different candidate roles of a meeting participant within the augmented reality map.

15. The non-transitory computer readable medium of claim 10, the operations comprising:

determining settings for a camera, one or more speakers, or a microphone that are internal or connected to the participant device at the location; and configuring the camera, the one or more speakers, or the microphone based on the settings.

16. The non-transitory computer readable medium of claim 10, the operations comprising:

determining settings for a camera, one or more speakers, or a microphone that are internal or connected to the participant device at the location;

creating a profile based on the settings; and configuring the camera, the one or more speakers, or the microphone according to the profile.

17. The non-transitory computer readable medium of claim 10, the operations comprising:

separating usage of speakers that are internal or connected to the participant device at the location, wherein a first portion of the speakers is used for participating in the video conference and a second portion of the speakers is used for a different usage.

18. A system comprising:

a device configured to:

obtain sensor data that include ambient qualities of multiple locations within a physical environment, wherein the ambient qualities include brightness levels and directions of light;

determine, based on the sensor data and from amongst the multiple locations, a location within the physical environment at which to place a participant device to connect to a video conference, wherein to determine the location comprises to:

determine scores for each of the multiple locations based on the brightness levels and the directions of light; and identify, based on comparing the scores, the location as a respective location of the multiple locations; and output an indication of the location for display at the device; and the participant device.

19. The system of claim 18, wherein the participant device is configured to:

detect internal and external cameras and speakers associated with the participant device;

determine, based on specifications associated with performance of each respective camera and each respective speaker of the internal and external cameras and speakers, a combination of a camera and one or more speakers to be used for participating in the video conference; and use the combination for participating in the video conference.

20. The system of claim 18, wherein the participant device is configured to:

detect internal and external cameras and speakers associated with the participant device;

determine, based on specifications associated with performance of each respective camera and each respective speaker of the internal and external cameras and speakers, a camera and one or more speakers to be used for participating in the video conference;

determine, based on a user preference, control parameters of the camera and the one or more speakers; and use the control parameters of the camera and the one or more speakers for participating in the video conference.

* * * * *